United States Patent [19]

Fellnor et al.

[11] 4,260,373

[45] Apr. 7, 1981

[54] METHOD AND APPARATUS FOR DRYING AND PREHEATING SMALL METALLIC PARTICLES

[75] Inventors: John R. Fellnor, Willingboro, N.J.; William J. Love, Jr., Perkasie, Pa.

[73] Assignee: Combustion Engineering, Inc., Windsor, Conn.

[21] Appl. No.: 1,745

[22] Filed: Jan. 8, 1979
(Under 37 CFR 1.47)

Related U.S. Application Data

[63] Continuation-in-part of Ser. No. 766,489, Feb. 7, 1977, Pat. No. 4,133,635.

[51] Int. Cl.³ .............................. F27B 7/00; F27B 7/14; F27B 7/38
[52] U.S. Cl. ...................................... 432/110; 34/135; 432/72; 432/116; 432/118
[58] Field of Search ...................... 432/17, 72, 110, 118, 432/112, 116; 34/135, 136; 75/44 R

[56] References Cited

U.S. PATENT DOCUMENTS

| | | | |
|---|---|---|---|
| 1,064,263 | 6/1913 | Wallos | 432/112 |
| 1,992,467 | 2/1935 | Blythe | 432/236 |
| 3,739,488 | 6/1973 | Khan | 34/95 |
| 3,811,822 | 5/1974 | Cherenson | 432/118 |
| 4,094,633 | 6/1978 | Peterson et al. | 432/118 |

FOREIGN PATENT DOCUMENTS 2377593  9/1978  France ...................................... 34/136

*Primary Examiner*—John J. Camby

[57] ABSTRACT

A system for drying and preheating small metallic particles such as chips, turnings, borings and the like to remove volatiles therefrom which includes a dryer working in conjunction with a briquetting press. The dryer includes a drying and preliminary combustion chamber includng a revolving drum therein through which the chips pass. The drying and preliminary combustion is heated and is atmospherically sealed and operated with a reducing atmosphere. The volatiles driven from the metallic particles are passed to a combustion completion chamber which is maintained at a temperature sufficient to burn the combustibles and into which air is injected to complete the combustion. The hot metallic particles are thermally insulated and sealed from the atmosphere while being conveyed from the drying and preliminary combustion chamber to the briquetting press where they are compressed into briquettes for subsequent introduction into induction furnaces and the like.

9 Claims, 18 Drawing Figures

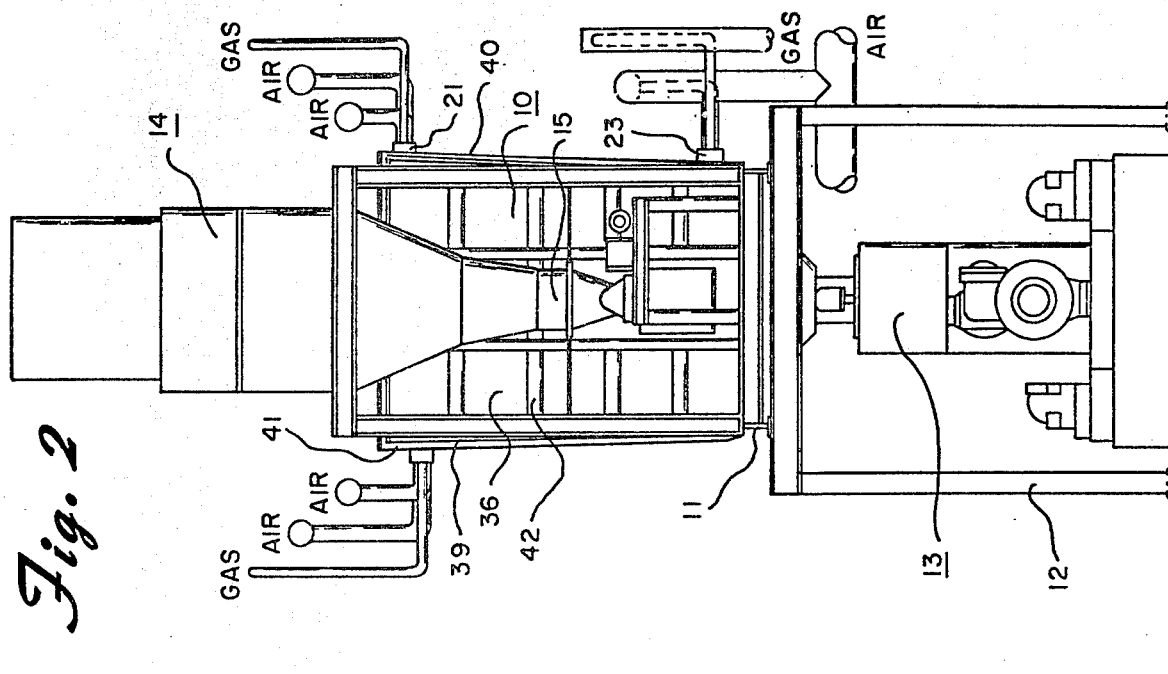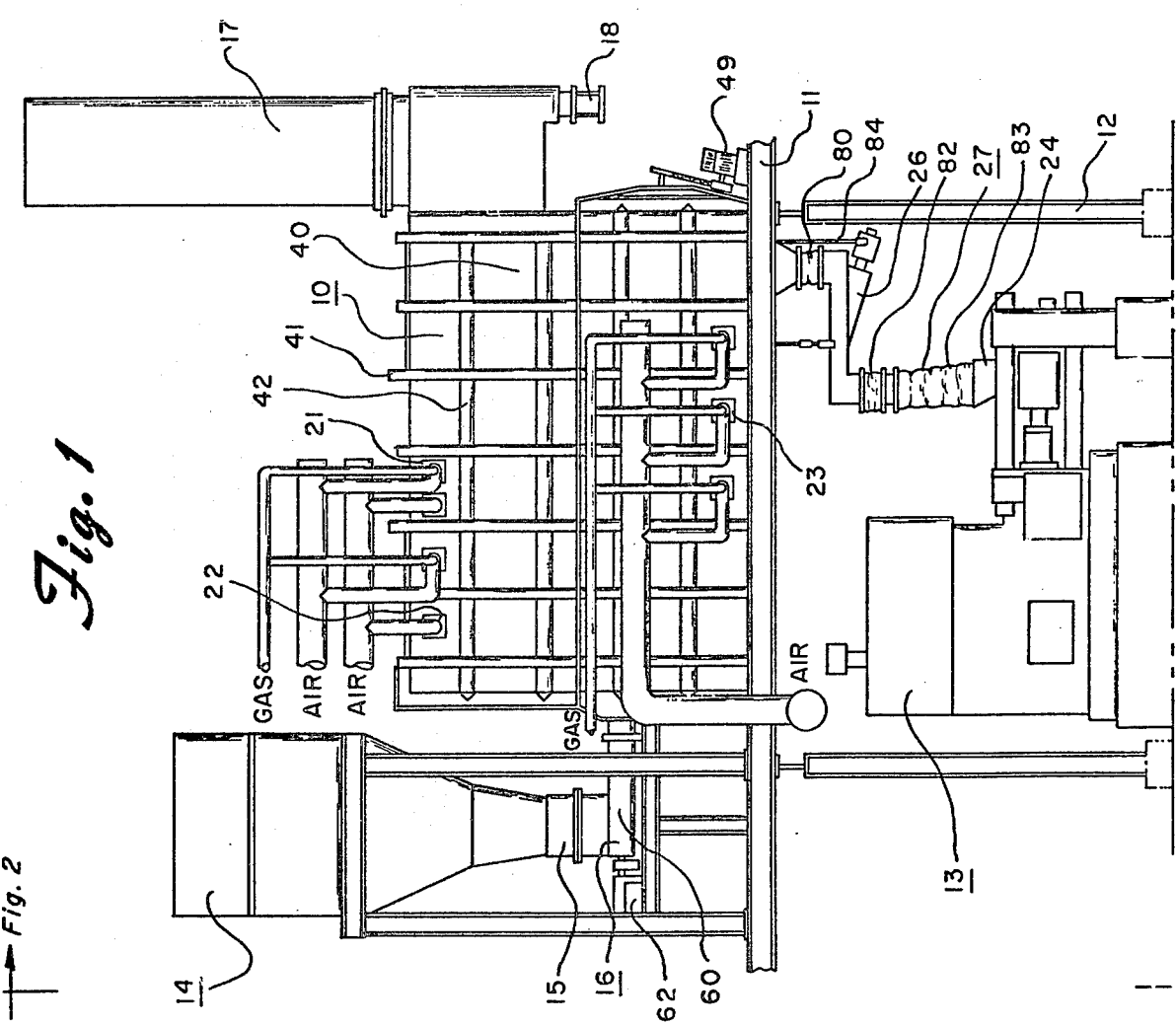

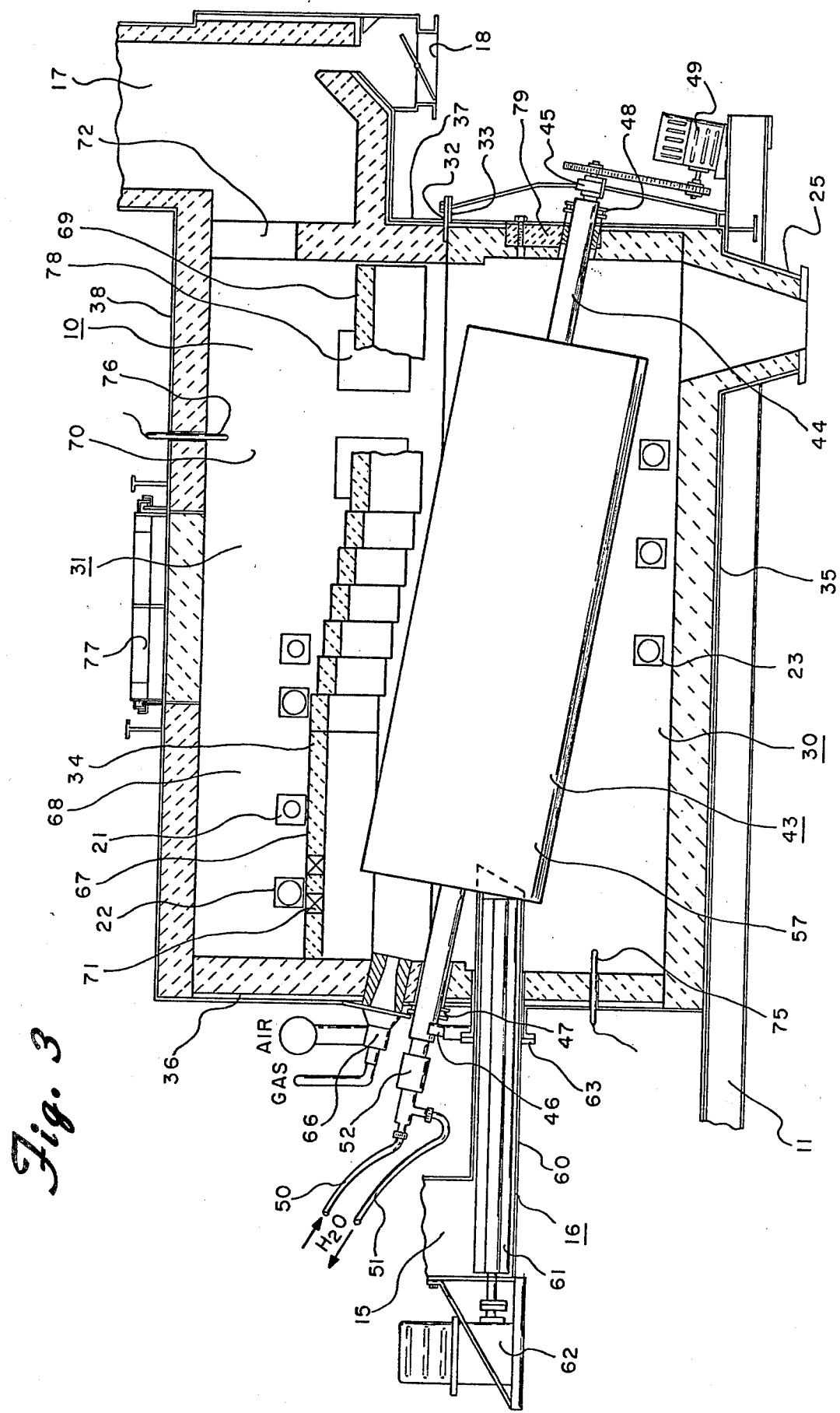

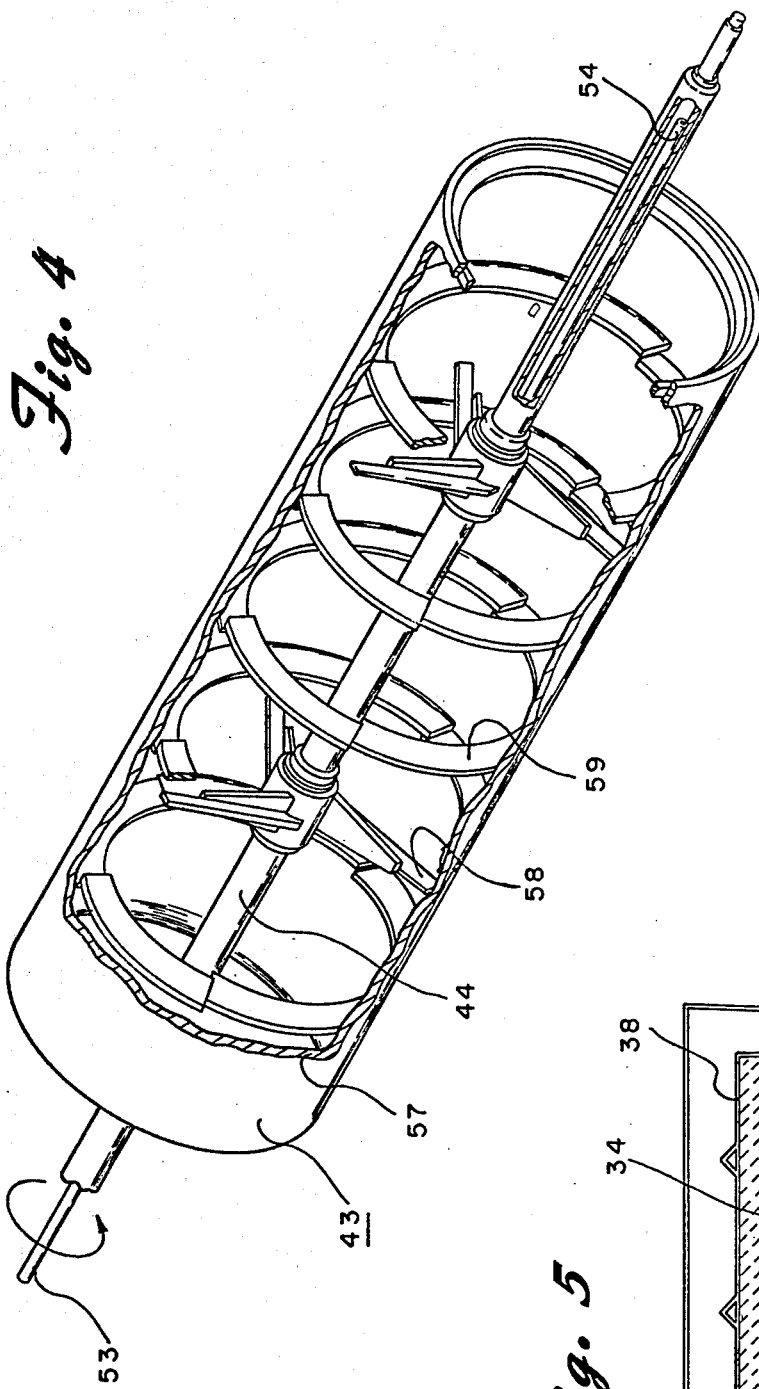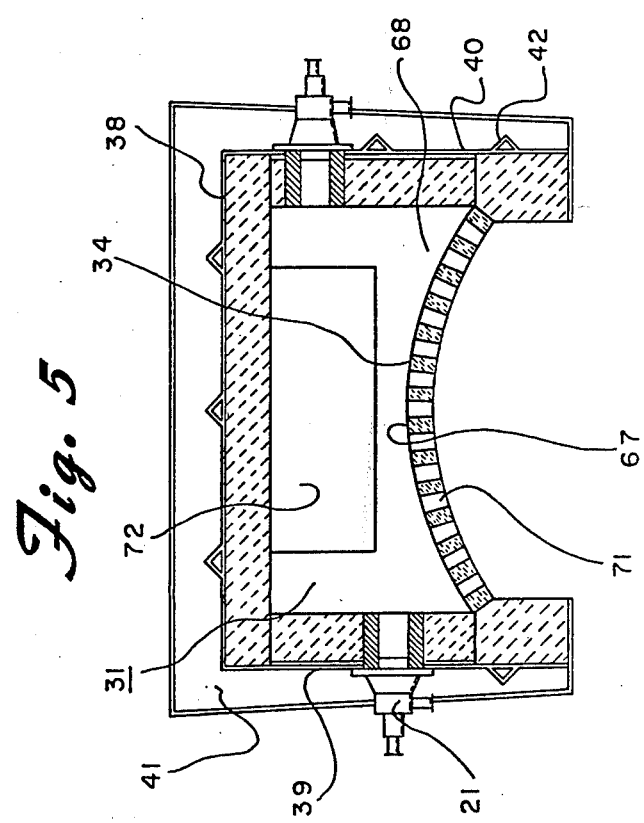

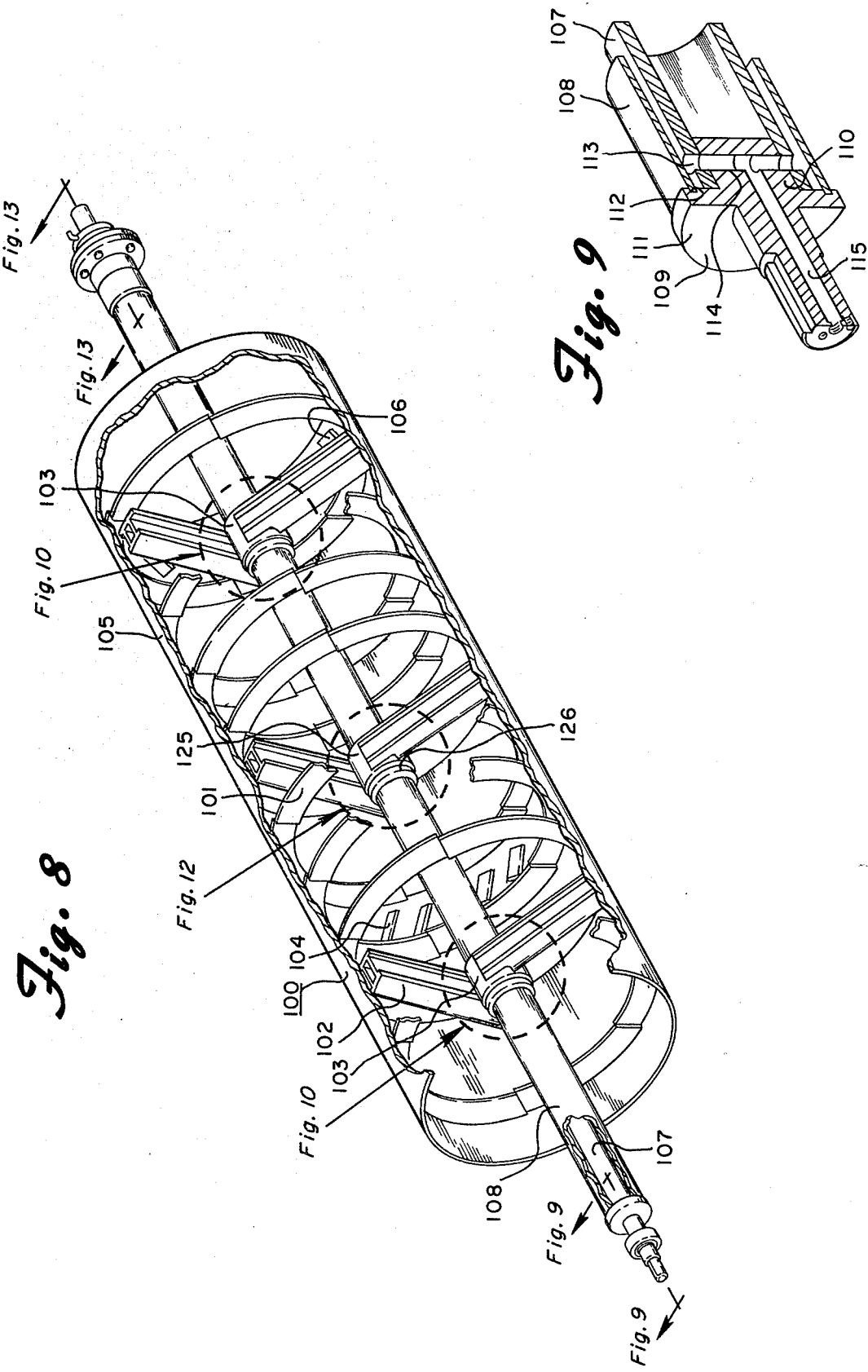

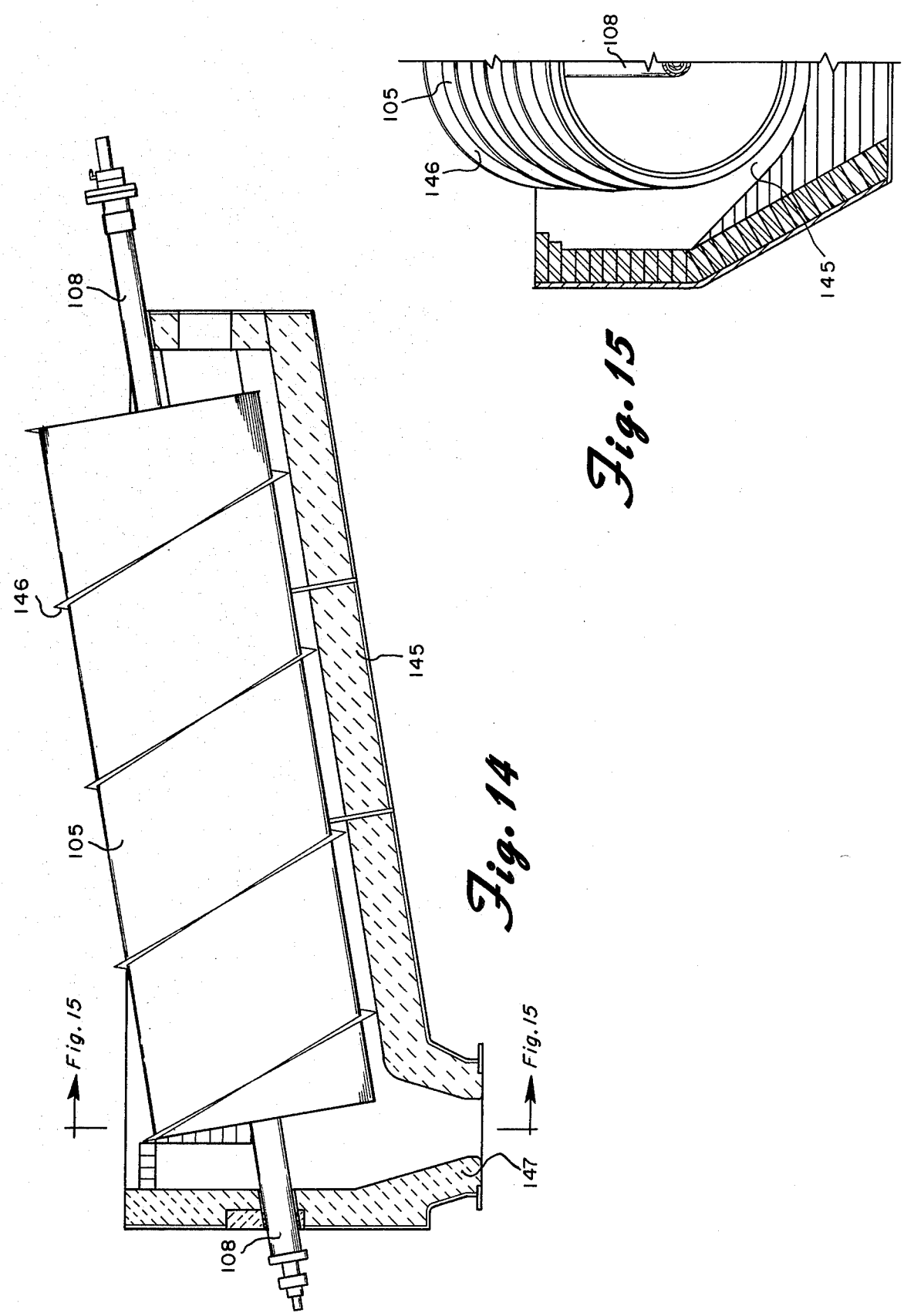

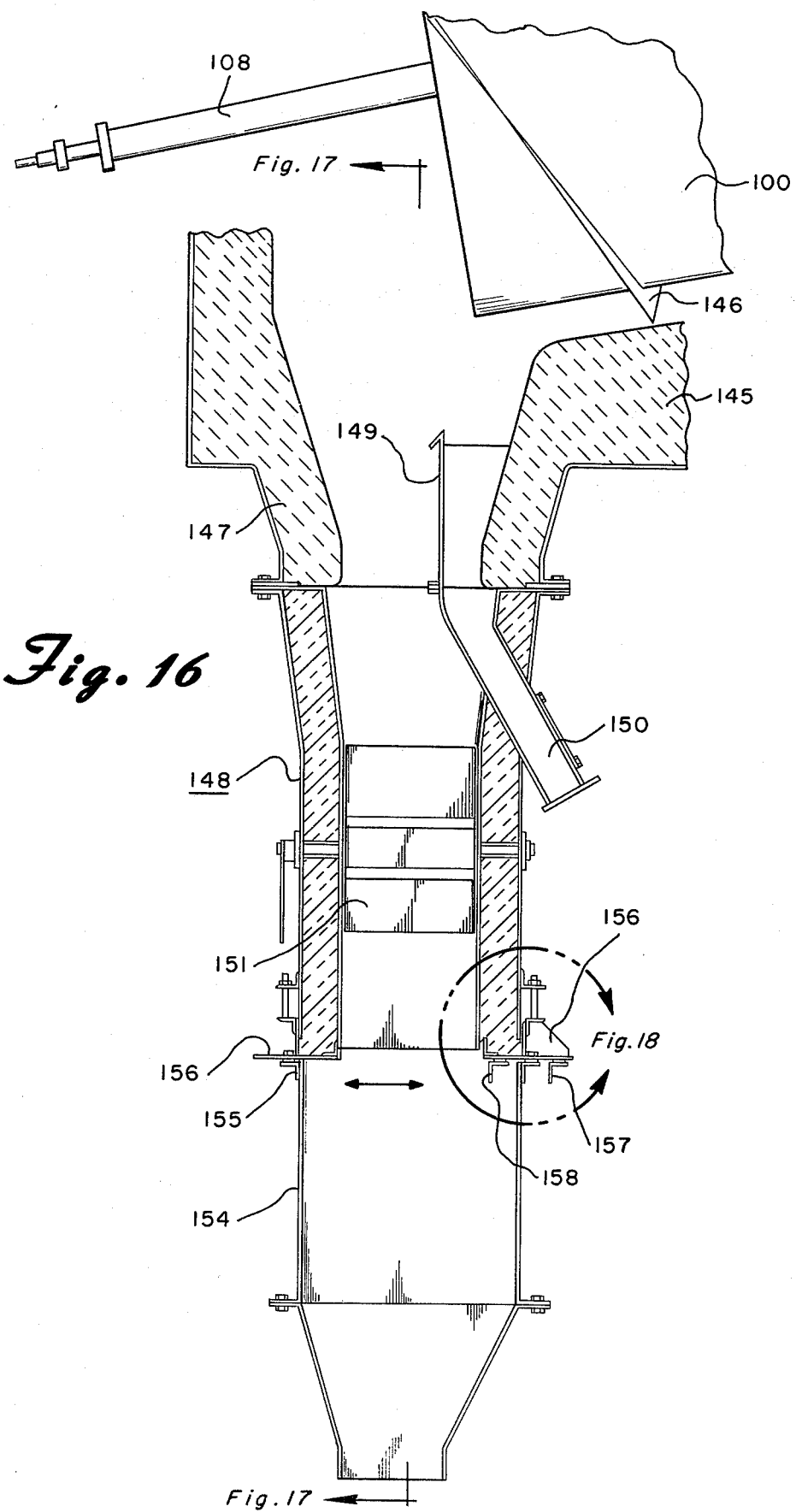

METHOD AND APPARATUS FOR DRYING AND PREHEATING SMALL METALLIC PARTICLES

This application is a continuation-in-part of application Ser. No. 766,489, filed Feb. 7, 1977, now U.S. Pat. No. 4,133,635.

BACKGROUND OF INVENTION

Industries such as foundaries, automotive plants and any other industry in which metal castings and other parts are machined create enormous quantities of scrap material. For example, the machining of engine blocks, which are essentially cast iron, will result in significant percentage of the engine block weight being machined off in the form of cast iron borings which are very fine metallic particles. The machining of steel parts likewise will result in steel chips and turnings which, although somewhat larger than the cast iron borings, are still relatively small.

During the machining operations, various cutting fluids will normally be used. These fluids may range from straight hydrocarbon or oil type cutting fluids to water base cutting fluids with water soluble oils therein. In a typical situation, the borings and turnings will include, by weight, from 2 to 6 percent of the cutting oil.

Recovery of the scrap borings, turnings and chips is desirable in view of the cost of basic materials. Nevertheless, recovery of these materials is expensive and difficult due to the nature of the borings and turnings. The loose nature of the borings and turnings makes them extremely difficult to handle. Additionally, it is inefficient to directly deposit the borings and turnings in a furnace or cupola inasmuch as they will float in the slag of an induction furnace or blow out the stack of a cupola and very little actual metal recovery will occur. Further, the high moisture and hydrocarbon content in the material creates a dangerous situation of moisture expansion or explosion within the furnace and also the hydrocarbon will create contamination and excessive smoking. Accordingly, direct introduction of the material is, for all practical purposes, nearly impossible.

The scrap recovery industry is currently utilizing large briquetting presses for compacting the borings and turnings into briquettes. In this operation, the material is fed cold to a briquetting press which will produce a compressed briquette ranging from a few pounds to more than 125 pounds per briquette. These cold briquettes, while a substantial improvement over the unprocessed material, do nonetheless have considerable problems. Cold briquetting does not remove the moisture or other hydrocarbons except to the extent that they are squeezed from the material during compression into a briquette. Nonetheless, there is still a considerably high percentage of moisture and hydrocarbon remaining in the finished cold briquette.

This moisture and hydrocarbon content of the cold briquette still presents considerable problems as respects the introduction of the briquette into furnaces or cupolas. The briquettes are somewhat successfully used in cupolas but they have not been successfully used in induction furnaces due to the danger of explosion within the rather narrow confines of the induction furnace. Additionally, the density of the briquette is not sufficiently high to prevent floating of the briquettes, to some degree in the molten bath. Accordingly, there is a significant weight loss of the material in the furnace by reason of entrainment in the slag and loss in the furnace gases. Additionally, the hydrocarbons present within the cold briquette cause considerable smoking and other contamination within the furnace.

The cold briquettes also suffer a severe problem of structural integrity. Notwithstanding the enormous pressures utilized in forming the briquette, the moisture and oil within the briquette as well as the fact that it was compressed cold tend to prevent the compressed particles from strongly adhering to one another. The structural integrity of the briquette is of greatest concern in transporting of the material. Very often the scrap material is collected by a scrap dealer who will transport the material to his base of operation at which the material is briquetted. The briquettes then are returned by means of truck or the like to the plant where they are to be remelted. This means that the briquettes must be loaded at the dealer's plant, transported by means of truck or the like and then ultimately unloaded and fed to the cupola or furnace. During these operations, a very substantial portion of the briquettes break up or crumble back to the loose borings and chips. This is especially true of cast iron borings which have been briquetted. The end result of this is that a substantial portion of the material cannot be used in the melting facility and must then be returned back to the dealer for rebriquetting. The effect of this is duplication of hauling expenses all of which distracts from the value of the briquette.

Various attempts have been made in the industry to overcome the foregoing problems by removing the moisture and hydrocarbons from the material prior to briquetting. Washers and dryers have been attempted. The washers will basically dissolve the hydrocarbon leaving the chips somewhat free of the hydrocarbons but still heavy with moisture. The wet material is then dried. The dryers heretofore used are essentially of the type which do not attempt to control the atmosphere within the dryer and use indirect heat or direct flames upon the material. In either case, the presence of oxygen in the dryer in conjunction with the elevated temperatures of the dryer results in oxidation of the material. Additionally, there is substantial carbon and silicon loss in the heated material. The dried material is briquetted in the normal fashion. However, the loss of carbon and silicon in the material and the presence of iron oxide seriously distracts from the value of the resultant briquette.

The washer and dryer combinations heretofore known also suffer from the problem of excessive smoke generation or pollution. The hydrocarbons, to the exent that they are not burned in the dryer, are permitted to escape to the atmosphere which creates serious problems of industrial pollution which is of great consequence in current times.

OBJECTS OF INVENTION

It is an object of the present invention to provide a system which includes apparatus and methods for drying and preheating small metallic particles such as chips, turnings, borings and the like to remove volatiles therefrom including moisture and hydrocarbons and hot briquetting of the particles without significant oxidation and loss of carbon and silicon in the resultant briquette.

It is a further object of the present invention to provide a system including apparatus and methods for drying and preheating small metallic particles in a manner that complete combustion of all hydrocarbons is achieved to reduce pollution and contamination.

It is yet a further object of the present invention to provide apparatus and methods for drying and preheating small metallic particles such as chips, turnings, borings and the like for ultimate forming into a briquette in which the carbon content of the resultant briquette may be increased by reason of the process within the apparatus and, if desired, alloying material added to the briquette through the process.

It is yet a further object of the present invention to provide improvements to apparatus and methods for drying and preheating small metallic particles providing for longer life of the apparatus, lower maintenance and improved control of the material being dried in the apparatus.

SUMMARY OF INVENTION

The overall system of the present invention includes a dryer operating in conjunction with a briquetting press. The dryer is essentially composed of two major sections, the first and lower section being a drying and preliminary combustion chamber and the upper section consisting of a combustion completion chamber.

The drying and preliminary combustion chamber includes therein a cylindrical elongate drum which is journaled upon a drum shaft secured in journals at either end of the drying and preliminary combustion chamber.

The material to be dried is stored in a feed hopper and is conveyed from the feed hopper to a screw feed conveyor. The discharge end of the screw feed conveyor deposits the material into the upper end of the drying drum. Rotation of the drum permits the material to be mixed and moved downwardly through the drum to a discharge hopper at the opposite end of the drying and preliminary combustion chamber.

A plurality of burners are positioned in the drying and preliminary combustion chamber. The burners are operated to generate heat within the chamber but of a reducing atmosphere. The volatiles on the chips are driven off and the hydrocarbon heavy effluent permitted to pass from the drying and preliminary combustion chamber to a combustion completion chamber. During this stage of the process, the reducing atmosphere will increase the carbon level in the material. Additionally, alloying material may be intermixed with the turnings and borings to provide an alloy mix in the metallic particles.

The combustion completion chamber includes a common chamber divider wall with the drying and preliminary combustion chamber in which there are positioned effluent entry ports which permit the hydrocarbon heavy effluent to enter the combustion completion chamber. The combustion completion chamber is an elongate chamber which includes a mixing section and an expansion and settling section which terminates and discharges to a chimney.

A plurality of preheat and pilot burners and air injectors are positioned within the mixing section of the combustion completion chamber. The preheat and pilot burners are operated to maintain a minimum low temperature in the combustion completion chamber and the air injectors are operated, as necessary, to inject sufficient oxygen to the combustion completion chamber to burn all of the hydrocarbons in the effluent. Particulate matter will settle in the expansion and settling chamber as the effluent moves through the chamber to the chimney. A damper is utilized in the chimney to regulate the negative pressure of draft within the system.

The resultant heated particles are conveyed through an atmospherically sealed and thermally insulated conveying system from the discharge hopper to the feed hopper of the briquetting press. In this manner, cooling and oxidation of the particles is prevented. The dried, hydrocarbon free hot particles are compressed into briquettes at the briquetting press.

DESCRIPTION OF DRAWINGS

FIG. 1 is a side elevation view of the dryer and associated briquetting press according to the present invention;

FIG. 2 is a left end view of the dryer and briquetting press according to the invention viewed from FIG. 1;

FIG. 3 is a sectional view through the dryer assembly of the present invention;

FIG. 4 is a perspective view partially cut away showing the details of the dryer drum of the present invention;

FIG. 5 is an end sectional view of the upper combustion completion chamber of the dryer of the present invention;

FIG. 8 is a perspective view of a further embodiment of drum assembly according to the present invention;

FIG. 9 is a perspective view partially cut away of the water discharge end of the cooled drum shaft in accordance with the present invention;

FIG. 14 is a side sectional view of a further embodiment of drum assembly and drying chamber in accordance with the present invention;

FIG. 15 is a partial end view of the drum assembly and drying chamber of FIG. 14;

FIG. 16 is a side elevation view in section of a further embodiment of discharge chute and chip box in accordance with the present invention;

DETAILED DESCRIPTION OF INVENTION

I. System Structure

Figure 6:
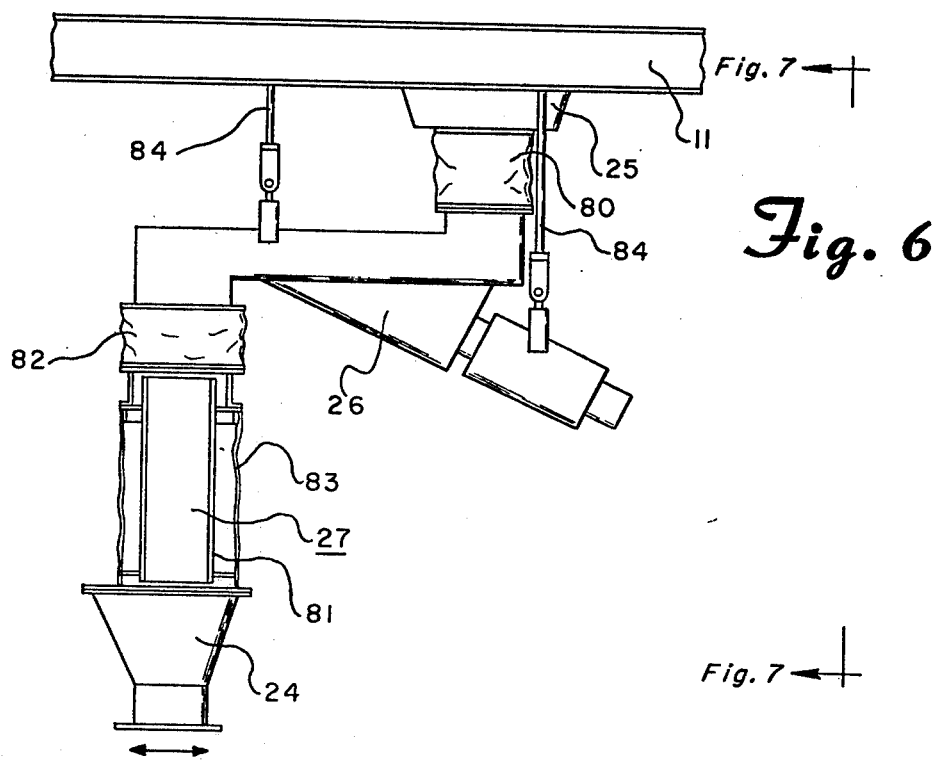
FIG. 6 is a detail side elevation view of the discharge hopper, metering conveyor and feed hopper arrangement for the briquetting press in accordance with the present invention.

The overall system of the present invention is shown in FIGS. 1 and 2 of the drawings. The system includes a dryer assembly 10 supported upon appropriate I beams 11 and columns 12 above a briquetting press 13. A feed hopper 14 is positioned at one end of the dryer assembly 10 and contains the metallic particles to be dried. A feed chute 15 is positioned at the lower end of the feed hopper 14 and conveys the material to the screw conveyor 16 to be described in more detail hereinafter.

The dryer assembly 10 includes, at the opposite end thereof, a chimney 17. The chimney, at the lowermost portion thereof, further utilizes a damper 18 as will also be described in more detail hereinafter.

The upper portion of the dryer assembly 10 includes a plurality of preheater and pilot burners 21 and air injectors 22 which are appropriately interconnected to gas and air manifolds as indicated in FIG. 1 for operation of the respective devices. Additionally, a plurality of secondary burners 23 are positioned in the lower portion of the dryer assembly 10. These secondary burners are likewise appropriately interconnected to gas and air manifolds for their operation as further shown in FIG. 1.

Referring further to FIG. 1, the briquetting press 13 includes a feed hopper 24. The discharge hopper 25 of the dryer assembly 10 is interconnected to the feed hopper 24 by means of a metering conveyor 26 and a discharge chute assembly 27 as will all be described in more detail hereinafter.

Referring now to FIG. 3, the details of the dryer assembly are shown. The dryer assembly includes a drying and preliminary combustion chamber 30 in the lower portion thereof and an elongate combustion completion chamber 31 superimposed on top of the drying and preliminary combustion chamber 30. The two chambers are joined together by means of corresponding cooperating flanges 32 and 33 on the combustion completion chamber 31 and drying and preliminary combustion chamber 30 respectively. The flanges 32 and 33 provide a common parting line for the chambers permitting their assembly and disassembly.

The combustion completion chamber 31 includes, in the bottom portion thereof, as may be seen in FIGS. 3 and 5, an arched chamber divider wall 34. The chamber divider wall 34 is formed of a suitable refractory material such as fire brick. The chamber divider wall 34 serves to define the drying and preliminary combustion chamber 30 and the combustion completion chamber 31.

The interior walls of both of the drying and preliminary combustion chamber 30 and combustion completion chamber 31 are lined with a refractory material such as fire brick as illustrated in FIGS. 3 and 5. The fire brick is held in place by means of exterior metal casing walls. The casing walls include the bottom casing wall 35, top casing wall 38, end casing walls 36 and 37 and side casing walls 39 and 40 as shown in FIGS. 1-3. All of the casing walls are likewise secured in place by means of vertical and horizontal supporting members 41 and 42 respectively.

Returning now to FIG. 3, the drying and preliminary combustion chamber 30 includes therein a drying drum assembly 43. The drum assembly 43 is journaled for rotation within the drying and preliminary combustion chamber 30 by means of a drum shaft 44. The drum shaft 44 is journaled at the right end by means of a shaft bearing 45 and on the left end by a pair of shaft rollers 46. Atmospheric shaft seals 47 and 48 are employed at either end of the drum shaft to seal the shaft from entrance by air from outside of the drying and preliminary combustion chamber for purposes to be hereinafter described.

The drum shaft and associated drum are rotated within the drying and preliminary combustion chamber by means of a variable speed drive motor 49 operating through a drive chain and sprocket arrangement as illustrated in FIG. 3. The drum shaft 44 is water cooled by means of inlet and outlet water lines 50 and 51 respectively operating through a rotating coupling 52 as may further be seen in FIG. 4.

Turning to FIG. 4, the internal details of the drying drum assembly 43 are shown. The drum shaft 44 is a hollow shaft and includes a smaller internal cooling line 53 positioned concentrically within the hollow drum shaft 44. The cooling line receives water from the rotating coupling 52 and passes the water to the opposite end of the hollow drum shaft 44. The water discharging from the discharge end 54 of the cooling line 53 returns back through the hollow shaft 44 to the rotating coupling 52 and in this manner cools the drum shaft.

The drying drum assembly 43 includes a drum shell 57 which is of length substantially the length of the drying and preliminary combustion chamber 30. The drum shell 57 is supported concentrically about the drum shaft 44 by means of a plurality of drum spokes 58 positioned longitudinally along the drum shaft 44. The drum spokes 58 are welded to the drum shell 57 at their outer ends and to the drum shaft 44 at their inner ends. The inner ends of the drum spokes 58 are welded tangentially to the drum shaft 44. This tangential securing arrangement compensates for radial expansion of the drum shaft 44 in a manner to prevent undue radial thrust upon the drum spokes and drum shell.

The drying drum assembly includes a plurality of arcuate segments 59 which form a convolution within the drum. In the embodiment shown in FIG. 4, five such convolutions are shown each made up of four arcuate segments.

The ends of each arcuate segment in a given convolution overlap the ends of its next adjacent segment. Additionally, the arcuate segments are inclined to the longitudinal axis of the drum to establish spacing between the ends of adjacent segments. The angle of the inclination of the arcuate segments is at a reverse lead angle to the direction of drum rotation as indicated by the arrow in FIG. 4. The metallic particles deposited into the drum will be thoroughly mixed and exposed to the atmosphere within the drum inasmuch as they cannot pass through the drum quickly due to the reverse lead angle of the segments. The particles will move from convolution to convolution by passing between the spacing between the ends of the adjacent segments. The foregoing structure is intended to assure thorough mixing of the metallic particles within the drum and also to extend the time required for passage of the particles through the drum.

The drum shell 57, drum spokes 58 and drum shaft 54 may be of any suitable material. In a preferred embodiment, the drum shell and spokes will be made of a high temperature resistant material such as stainless steel and also a material which has high wear resistance.

Returning now to FIG. 3, the metallic particles are fed to the drying drum assembly 43 by means of a screw conveyor 16. The screw conveyor 16 includes a screw feeder casing 60 and a screw feeder 61 positioned within the screw feeder casing. A variable speed drive motor 62 operates to drive the screw feeder 61.

The screw feeder casing 60 passes through the casing wall 36 of the drying and preliminary combustion chamber 30 and extends generally into the upper open end of the drying drum assembly 43. An atmospheric casing seal 63 surrounds the screw feeder casing 60 and is likewise secured to the casing wall 36 in a manner to atmospherically seal the screw feeder casing with the casing wall 36.

The screw feeder 61 has an increasing lead angle in the direction of the drying drum assembly. This design is intended to permit a large quantity of metallic particles in the feed chute 15 to rest upon the screw feeder 61 so as to atmospherically seal the feed chute 15 from the drying and preliminary combustion chamber 30 while the increased lead angle will quickly remove the materials from the high density area into the drying drum assembly without undue compaction of the material.

The drying and preliminary combustion chamber 30 includes therein a plurality of secondary burners 23 and at least one primary burner 66. The secondary burners 23 are appropriately plumbed with air and gas manifolds as shown in FIG. 1. The secondary burners are positioned generally in the bottom portion of the drying and preliminary combustion chamber 30. However, the burners are inclined upwardly toward the drying drum assembly 43 so that their products of combustion will strike the drying drum assembly 43 tangentially of the drum along the lower longitudinal extremity.

The primary burner 66 is positioned in the end casing wall 36 in line with and above the drum shaft 44. The burner extends just slightly past the inside portion of the refractory material positioned on the end wall casing 36 and the products of combustion are directed downwardly into the upper end of the drying drum assembly 43. The primary burner 66 is appropriately plumbed with gas and air manifolds as shown in FIG. 3. The operation of the primary burner 66 will be described in more detail hereinafter.

Further referring to FIG. 3, attention will now be directed to the combustion completion chamber 31. The chamber divider wall 34 forming the bottom portion of the combustion completion chamber 31 has a relatively horizontal extending portion 67 which forms a mixing section 68 in the combustion completion chamber. Beyond the horizontal portion 67, the refractory material is stepped down for a portion of the longitudinal distance of the combustion completion chamber to a second horizontal portion 69 to define an expansion and settling section 70 within the combustion completion chamber.

As may be seen in FIGS. 3 and 5, the horizontal portion 67 of the chamber divider wall 34 includes therein a plurality of effluent entry ports 71 which are positioned above the upper end of the drying drum assembly 43. At the opposite end of the combustion completion chamber and at the end of the second horizontal portion 69 of the chamber divider wall 34, the combustion completion chamber includes an effluent restriction discharge port 72 formed in the end wall casing 37 of the dryer assembly. The effluent restriction discharge port 72 represents a restriction of approximately one half the cross-sectional area of the expansion and settling section of the combustion completion chamber and presents a flow restriction to the combustion completion chamber for the purpose to be hereinafter described.

A combustion completion chamber chimney 17 is disposed at the end of the combustion completion chamber 31 in communication with the effluent restriction discharge port 72 as shown in FIG. 3. The combustion completion chamber chimney 17 provides the negative pressure or draft and vent for the resultant burned gases as hereinafter described.

A negative pressure control damper 18 is positioned in the bottom portion of the combustion completion chamber chimney 17. The damper may be of the barometric type or of the motor driven type. In the embodiment wherein the damper is of the motor driven type, a pressure monitoring device (not shown) is positioned within the combustion completion chamber 31 and operates through servocontrols (not shown) to control the motor driven damper to maintain the negative pressure within the combustion completion chamber at a predetermined level.

The combustion completion chamber in the mixing section 68 thereof includes a plurality of preheat and pilot burners 21 and a plurality of high velocity air injectors 22. As may be more specifically seen in FIG. 5, and in the embodiment shown, there are four preheat and pilot burners 21 and four high velocity air injectors 22 utilized. Two of the preheat and pilot burners and two high velocity air injectors are positioned on one side of the combustion completion chamber at a low point adjacent the chamber divider wall 34 whereas the other two preheating pilot burners 21 and two high velocity air injectors 22 are positioned at a high point in the combustion completion chamber adjacent the upper wall of the chamber. In this manner, the products of combustion from the preheat and pilot burners are more significantly the air jets injected from the air injectors 22 create a transverse vortices within the mixing section 68 of the combustion completion chamber 30 to aid in mixing and completing combustion of the hydrocarbon rich effluent passing into the combustion completion chamber through the effluent entry ports 71.

A temperature sensing probe 75 is positioned within the drying and preliminary combustion chamber 30. In a like manner, a similar temperature sensing probe 76 is positioned within the combustion completion chamber 31. The temperature sensing probes 75 and 76 operate through servocontrollers (not shown) which control the secondary burners 23 and preheat and pilot burners 21 and high velocity air injectors 22 within their respective chambers to maintain temperature control as hereinafter described.

The combustion completion chamber 31 further includes an inspection hatch 77 in the upper casing wall 38. This inspection hatch 77 is provided in order that access may be had to the combustion completion chamber. Additionally, two clean out ports 78 are positioned on each side of the combustion completion chamber at a level adjacent the second horizontal portion 69 of the combustion completion chamber and on each side thereof. These clean out ports are used to withdraw particulate matter which has settled in the expansion and settling section 70 of the combustion completion chamber.

The upper end of the drum shaft 44 of the drying drum assembly 43 is positioned on shaft rollers 46 as heretofore described at the parting line between the flanges 32 and 33 for the combustion completion chamber and the drying and preliminary combustion chamber. The opposite end of the shaft is journaled in shaft bearing 45 as heretofore described. Additionally, a drum removal plug 79 is positioned immediately above the shaft seal 48. The drum removal plug includes a plurality of threaded fasteners which hold the plug in place and permit the plug to be withdrawn from the end casing of the chamber. In this manner, once the combustion completion chamber has been separated from the drying and preliminary combustion chamber and the drum removal plug likewise removed, the entire drying drum assembly may be withdrawn upwardly out of the drying and preliminary combustion chamber.

Figure 7:
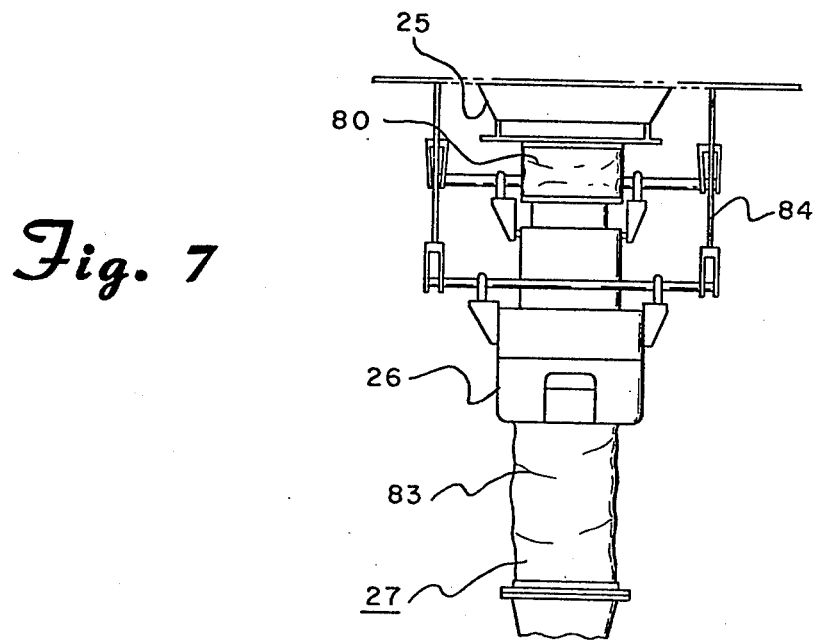
FIG. 7 is a right end view of the assembly of FIG. 6.

Referring to FIG. 3, the preheated and dryed metallic particles are discharged from the lower end of the drying drum assembly and pass into a discharge hopper 25. As best seen in FIGS. 6 and 7, the discharge hopper feeds its output into a vibratory metering conveyor 26 supported by suspension bars 84 which, in turn, discharges into a discharge chute assembly 27 that deposits the metallic particles into the press feed hopper 24.

The discharge hopper 25 is thermally insulated to prevent cooling of the metallic particles. Additionally, the discharge hopper includes an atmospheric seal in form of an asbestos sleeve 80 interconnected between the bottom of the discharge hopper 25 and the upper portion of the vibratory metering conveyor 26. This flexible sleeve 80 also provides the flexible interconnection between the discharge hopper and the vibratory metering conveyor which is horizontally oscillating in its operation.

The vibratory meter conveyor, as described in more detail hereinafter, is also thermally insulated and atmospherically sealed. The metering conveyor may be periodically operated as necessary to maintain the proper level of material in the press feed hopper 24.

The vibratory metering conveyor 26 further includes a discharge chute sleeve 81 which extends to the press feed hopper 24. An upper flexible sleeve 82 is provided to atmospherically seal and thermally insulate the upper portion of the discharge chute sleeve 81. Additionally, a lower flexible sleeve 83 is provided and surrounds the lower portion of the discharge chute sleeve 81 to atmospherically seal and thermally insulate the discharge chute sleeve. The lower portion of the lower flexible sleeve seal 83 is connected to the upper portion of the press feed hopper 24 to complete the atmospheric seal with the press feed hopper. The upper flexible sleeve 82, and more particularly, the lower flexible sleeve 83 permit relative movement between the movable press feed hopper 24 and the relatively stationary discharge chute 81. This relative movement is necessary to accommodate briquetting presses of design in which the press feed hopper 24 shuttles between feed and discharge positions during the press operation.

Material level sensing probes (not shown) may be installed in the press feed hopper 24. One form of probe which may be used is an electric conductivity probe. The probes will be placed at a high point and a low point in the feed hopper. As the press consumes the metallic particles, the material in the feed hopper will reach the low probe which will sense a lack of conductivity and, in response, operate the vibratory metering conveyor. Once the metering conveyor has delivered sufficient material to fill the press feed hopper to the high conductivity probe, conductivity at that point will be sensed and the metering conveyor operation discontinued.

Other variations and modifications of the drying drum assembly are shown in FIG. 8 and the details of certain aspects thereof in FIGS. 9–13.

Figure 13:
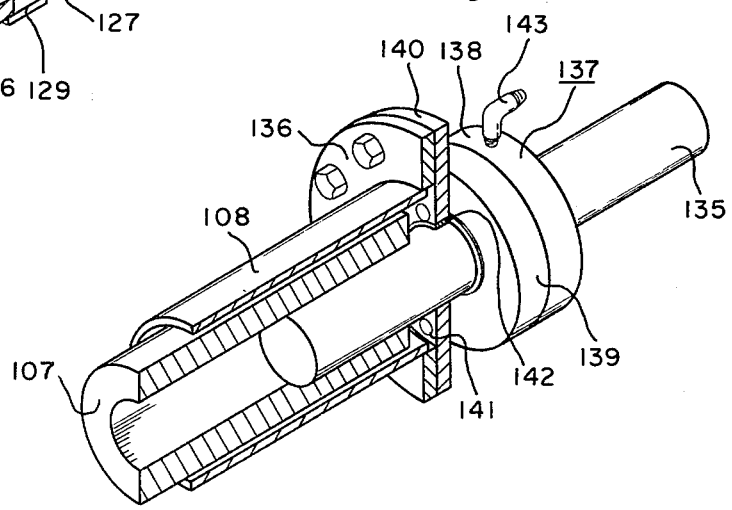
FIG. 13 is a perspective view partially cut away of the drum shaft and water cooling jackets at the water inlet end thereof.

In the embodiment shown in FIG. 13, the drying drum assembly 100 includes the plurality of rows of reverse lead arcuate segments 101 as in the embodiment of FIG. 4. Likewise, the outer drum is supported in place by means of a plurality of spokes 102 interconnecting the inner circumference of the drum with a plurality of hubs 103 positioned upon the drum shaft likewise as in the embodiment in FIG. 4. The spokes 102 are positioned tangent to the hubs 103 in order to provide for radial compression resulting from expansion of the metallic members during heating of the drum.

In the embodiment of drum shown in FIG. 8, there is also provided a plurality of paddles 104 arranged in rows selectively intermediate certain rows of arcuate segments 101. The paddles 104 are secured to the inner circumference of the drum shell 105 by such suitable means as welding and are inclined at an angle to the longitudinal axis of the drum such as to provide a reverse lead angle in the direction of rotation of the drum assembly. The various rows of paddles positioned between the rows of arcuate members serve to further aid in retarding the movement of the metallic particles being heated through the drum assembly while at the same time also providing for agitation or mixing of the material to insure complete drying of the particles.

A further row of paddles 106 are also provided at the entrance end of the drum assembly. These arcuate paddles are likewise secured to the inner circumference of the drum shell 105 but are inclined at a forward lead angle to the longitudinal axis of the drum in the direction of rotation. This forward lead angle of the row of paddles 106 at the entrance end of the drum insures that the metallic particles which have been deposited in the drum as heretofore described are maintained within the drum to avoid spilling out of the particles from the entrance end of the drum.

In the embodiment of drum assembly shown in FIG. 8, the hubs 103 are carried on a hollow drum shaft 107 generally of the nature of drum shaft heretofore described. However, in the embodiment shown in FIG. 8, the cooling of the drum shaft is not internal but is external by means of a plurality of external shells 108 positioned around and spaced from the external circumference of the drum shaft as to be hereinafter described in detail.

Referring to FIG. 9, the details of the interconnection of the drum shaft 107 and the outer cooling jacket or shell 108 is shown. A flanged insert 109 is provided which includes a first end thereof 110 adapted to engage and be interlocked into the inner circumference of the drum shaft 107. A flange 111 of the flanged insert 109 provides a stop against the end of the drum shaft 107 and also, by means of an annular groove 112, provides a recess into which the end of the lower water jacket 108 fits and is secured in space relationship to the drum shaft 107. The flanged insert, drum shaft and water jacket may all be appropriately welded together during assembly.

The flanged insert 109 provides the discharge end for cooling water passing through and between the water jacket 108 and drum shaft 107. This is accomplished by means of a plurality of apertures 113 in the drum shaft 107 which work in communication with a like plurality of apertures 114 in the flanged insert 109. The apertures 114 communicate with a channel 115 which leads to the end of the flanged insert 109 and operates in conjunction with an appropriate hydraulic coupling to pipe the cooling water from the drum shaft.

Figure 10:
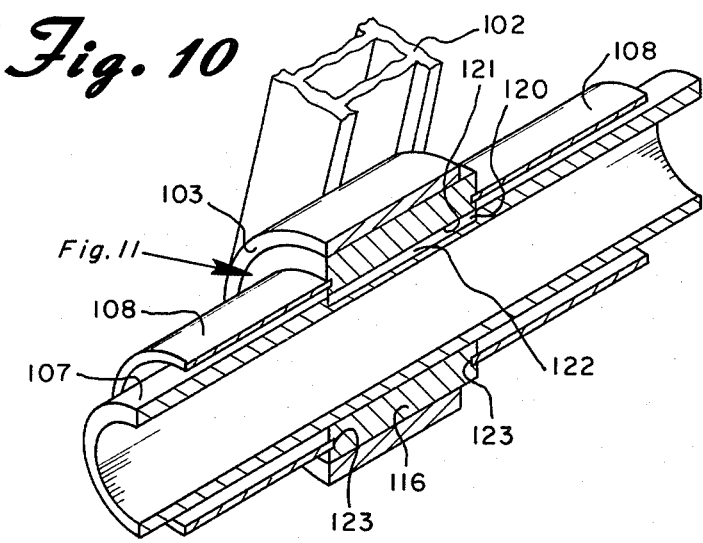
FIG. 10 is a perspective view partially cut away showing the interconnection of the water jackets to the drum shaft and hub and spoke arrangement.

The water jacket 108 extends from the flanged insert 109 to the hub 103. The details of the interconnection of the water jacket 108 to the hub 103 are shown in FIG. 10. A collar 116 is provided which slides over the drum shaft 107. A keyway 120 is provided in the drum shaft and a keyway 121 in the collar which cooperates with a key 122 in the drum shaft to permit the transmission of torque to the collar but providing for longitudinal movement of the collar relative to the drum shaft to accommodate for thermal expansion and movement of the collar and water jacket 108 relative to the drum shaft.

The collar 116 includes an annular groove 123 at either end of the collar. The annular grooves 123 provide a recess into which the water jacket 108 is fitted and ultimately welded to maintain the water jacket in space relationship to the drum shaft 107 to thus provide the annular water passage between the two.

The hub 103 has an internal diameter such that it may fit snuggly over the outer circumference of the collar 116 but still permit relative movement of the hub relative to the collar 116 to accommodate for differences in thermal expansion and contraction and movement of the members relative to one another.

Figure 11:
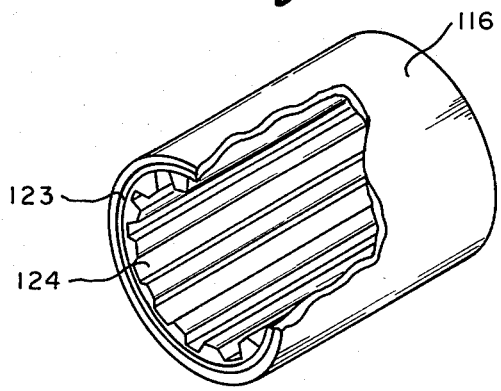
FIG. 11 is a perspective view partially cut away showing the details of the water jacket collar utilized in the arrangement of FIG. 10.

The collar 116, as may be seen in FIG. 11, also includes a plurality of channels 124 cut longitudinally through the inner circumference of the collar. These channels provide a fluid passageway for the cooling fluid from one side of the collar to the other thus permitting fluid passage between one portion of the water jacket 108 to the other across the hub and collar interconnection with the drum shaft 107.

In the embodiment shown in FIG. 8, three hub-spoke arrangements have been provided for the interconnection of the drum shell to the drum shaft. In the embodiment in FIG. 8, the hub assemblies 103 at either end of the dryer drum assembly are identical. The inner or middle hub assembly 125 and its associated collar 126 differ as shown in FIG. 12 of the drawings.

Figure 12:
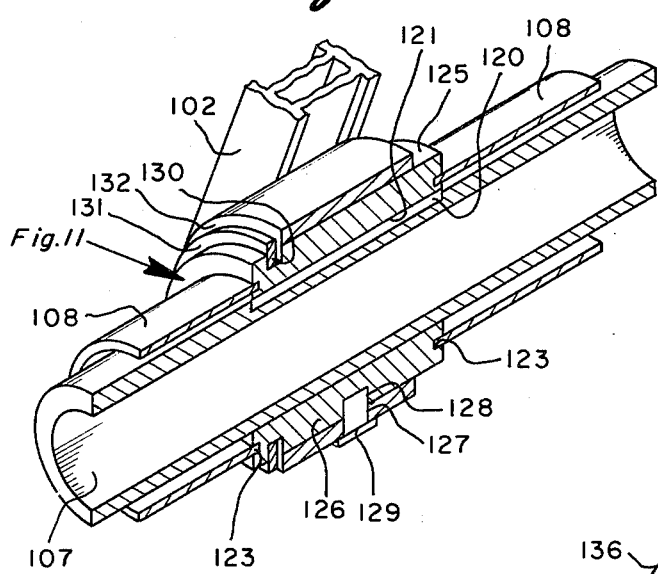
FIG. 12 is a perspective view partially cut away showing the details of the drum shaft, water cooling jackets, collar hub and spokes for the driven hub assembly in accordance with the present invention.

Referring to FIG. 12 of the drawings, the middle collar 126 is keyed to the drum shaft 107 by means of keyways 120 and 121 in the drum shaft and collar respectively working in conjunction with a key 122 as in the case of the hub assembly shown in FIG. 10. However, the hub 125 and collar 126 have mating apertures 127 and 128 respectively into which a shear pin 129 is force fitted to provide a positive torque interconnection between the hub 125 and the collar 126. In this manner, driving torque on the drum shaft 107 may be transmitted through the collar 126 to the hub 125 to, in turn, drive the drum through the spokes 102.

The collar 126 includes an annular groove 130 cut in one edge portion of the collar. A split ring 131 is positioned into the annular groove 130 and is of height sufficient enough to abut one shoulder 132 of the hub 125. In this manner, the hub 125 is maintained against lateral movement relative to the water jacket shells 108 and thus maintains the inclined drying drum assembly in proper position within the drying chamber relative to the drum shaft and water jackets.

As in the embodiment shown in FIG. 10, the collar 126 also includes annular recesses 123 at either end of the collar into which the water jackets 108 fit to maintain them in proper respect to the drum shaft 107.

The details of the manner by which the water jacket 108 is interconnected with the drum shaft 107 at the upper end of the drum shaft and at which the cooling water is introduced is shown in FIG. 13 of the drawings. An axle 135 is force fitted and secured into the opened end of the hollow drum shaft 107. The axle 135 extends a distance from the end of the drum shaft 107 and is secured into a bearing assembly (not shown) to support the upper end of the drum shaft.

The water jacket 108 terminates into and is welded to a first flange 136. A rotatable water coupling 137 is positioned over the shaft 135 and includes appropriate seals to prevent leakage from the stationary input ring 138 between the ring and the shaft 135. A rotatable output ring 139 is secured by means of a mating flange 140 to the first flange 136 to hold the assembly in place. A plurality of coolant input apertures 141 through the wall of the mating flange 140 of the coupling are provided to permit the flow of water from the input ring 138 through the rotating ring 139 and into the cavity formed between the drum shaft 107 and water jacket 108. A water tight seal 142 is provided between the shaft 135 and the cooperating flange 140 to maintain the fit between the shaft and the flange water tight while permitting lateral movement between the two. Coolant is provided to the system by means of a fitting 143 in the stationary input ring 138 of the assembly.

The arrangement described in respect to the drum shaft, water jacket and hub assembly shown in FIGS. 10-13 permits complete freedom of movement of the water jacket 108 along the entire length of the drum shaft 107 relative to the drum shaft. Additionally, the hub 126 is the only hub secured to the drum shaft and, accordingly, the entire drum shell 105 is free to expand or contract relative to the water jacket 108 and drum shaft without causing any stress or strain upon the drum shaft.

In some applications, the material being dried will contain an extreme amount of very fine powder or particulate matter. Under these conditions, the circulation of gases through the drum will cause the fine material to be circulated into the drying chamber externally of the drum and ultimately settle to the bottom portion of the drying chamber. A further modification to the drying and drum has been made to resolve problems of buildup of dust as shown in FIGS. 14 and 15 of the drawings.

In the embodiment shown in FIGS. 14 and 15, the lower portion of the drying chamber has been inclined upwardly at an angle corresponding to the angle of inclination of the drum shell 105. Additionally, the lower portion or floor 145 of the drying chamber, as best seen in FIG. 15, is made concave such as to be of complementary configuration to the outside circumference of the drum shell 105 substantially for the entire length of the drum shell. The surface of the lower portion or floor 145 of the drying chamber is spaced in close proximity to the outer surface of the drum shell 105.

A continuous arcuate flight 146 is positioned on the outer circumference of the drum shell 105 and spirals along the entire length of the drum shell 105. The lead angle of the arcuate flight is a positive lead angle in the direction of rotation of the drum. The height of the flight is approximately the spacing between the outer circumference of the drum shell and the bottom wall of the drying chamber. During operation, the arcuate flight will collect any fine dust or powder that has settled to the bottom floor and continuously move the material downwardly along the floor of the drying chamber until material is discharged into the discharge hopper 147.

Figure 17:
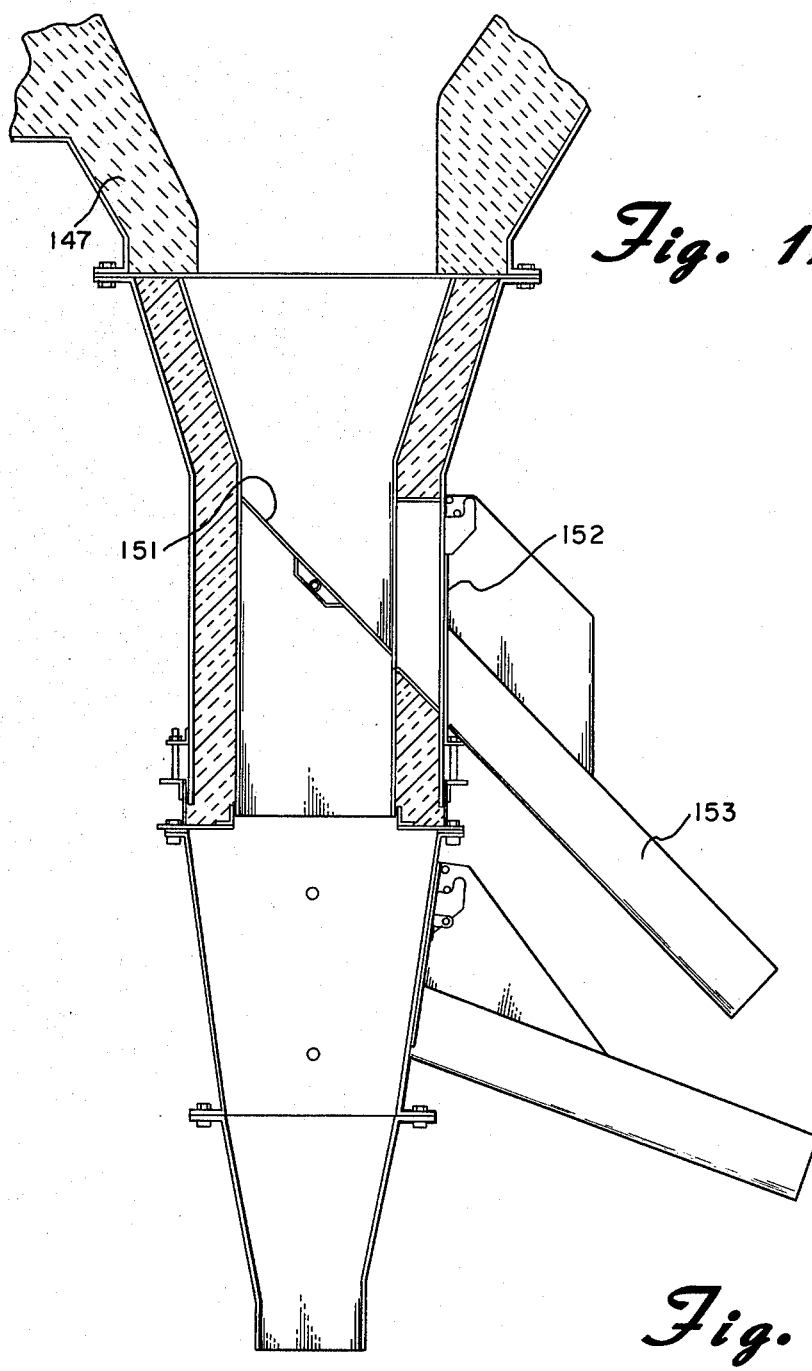
FIG. 17 is an end sectional view of the discharge chute and chip box of FIG. 16.

Another embodiment of discharge chute which may be used in accordance with the chip dryer of the present invention is that shown in FIGS. 16 and 17 of the drawings. The discharge chute 148 has, in the upper portion thereof, a baffle 149 which projects upwardly into the discharge hopper 147 of the drying chamber. The baffle 149 is positioned below and adjacent the discharge end of the drum assembly 100.

The baffle 149 extends entirely across the width of the discharge hopper 147 in the upper portion thereof and is inclined inwardly toward the bottom portion thereof to form a discharge chute 150 which projects beyond the side wall of the discharge chute 148. In operation, the flights 146 on the outer circumference of the drum will bring the fine material to the edge of the discharge hopper whereupon they will be diverted by the baffle 149 into the chute 150. In this manner, the fines are separated from the other particulate matter which has been dried and are not intermingled with the coarser material. In many instances, depending upon the application, it is not desirable to intermix the fine material with the coarser material. The finer material may then be dealt with as desired.

The discharge chute shown in FIGS. 16 and 17 of the drawings also includes an upper diverter plate 151 positioned through the cross-section of the discharge chute. The diverter plate operates in conjunction with a trap door 152 and a chute 153.

In operation, when it is desired to pass chips to the chip box of the press, the diverter valve 151 will be maintained in a vertical position and the trap door 152 maintained closed. In some cases it may be necessary to clear the drum of particles without passing the material through the chip box in a case such as where the press may become inoperative. In these situations, the diverter valve may be deflected to the position as shown in FIG. 17 and the trap door 152 opened whereupon the chips may be emptied from the drum through the discharge chute and into a remote stock pile by means of the chute 153 thus bypassing the chip box of the press.

The discharge chute shown in FIGS. 16 and 17 also provides for a different mode of accommodating for movement between the chip box of the press and the discharge chute. In the embodiment shown in FIGS. 16 and 17, the chip box is sealed relative to the lower portion of the stationary discharge chute 148 by means of angle irons 155 which are positioned on the upper four sides of the chip box 154. These angle irons 155, in the plane shown in FIG. 16, slide in contact with large flanged plates 156 positioned on the bottom portion of the discharge chute 148. Stops 157 and 158 are provided to limit the length of travel of the angle irons 155 of the chip box relative to the plates 156 of the discharge chute.

Figure 18:
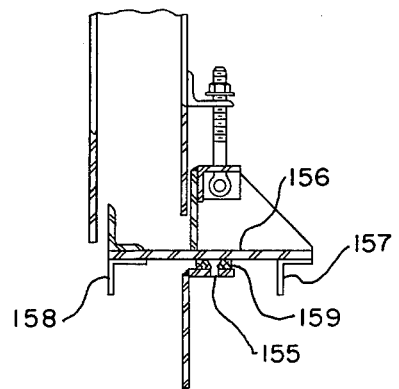
FIG. 18 is a sectional side view of the details of the interconnection between the discharge chute and the chip box of the embodiment of discharge chute and chip box shown in FIG. 17.

The detail of the manner of sealing and providing for friction free movement of the angle irons 155 relative to the plates 156 is shown in FIG. 18 of the drawings. A dual row of sealed ball bearings 159 are positioned on the perimeter flange or angle irons 155 of the chip box and secured thereto. The bearings roll in friction free sealing engagement against the plate 156 of the discharge chute. In this manner, the chip box may move freely relative to the discharge chute while providing atmospheric sealing between the chip box and the discharge chute.

II. System Operation

Start up of the system includes starting the drum drive but not the screw feed conveyor. The secondary burners 23 and primary burners 66 are ignited in the drying and preliminary combustion chamber. Additionally, the preheat and pilot burners 21 are ignited.

The temperature controls for the drying and preliminary combustion chamber and the combustion completion chamber are set to the required temperature range which depends upon the condition of the material to be dried and also the type of material. The temperature span which may be achieved in the drying and preliminary combustion chamber 30 is from between 800 degrees Fahrenheit to 1400 degrees Fahrenheit. Where the metallic particles are steel or lower melting point materials such as aluminum and brass, the temperature controller will be set for the 800 degree Fahrenheit level. In the case of materials such as cast iron, the upper range of approximately 1400° F. would be chosen. However, any temperature between the controller extremes may be utilized based upon experience, the condition of the material and the type of material as necessary to completely remove the moisture and hydrocarbon from the material without oxidizing the material.

In a like manner, the temperature controls for the combustion completion chamber will be set based upon the condition of the material, i.e. the amount of moisture and particularly the type and amount of hydrocarbon expected to be present in the effluent. In drying normal material, the low set point for the combustion completion chamber will be set for approximately 1200 to 1400 degrees Fahrenheit which is a stand by or idle temperature.

Once the preset temperatures have been achieved in the drying and preliminary combustion chamber and the combustion completion chamber, the screw conveyor 16 will then be operated to deliver material to the drying drum assembly 43.

The amount of hydrocarbon and type of hydrocarbon present in the material to be dried will dictate the air to fuel ratio at which the primary burner 66 and secondary burners 23 will be operated. If the material being dried is low in hydrocarbon, then there will be less combustible material present in the drying and preliminary combustion chamber and accordingly, the secondary burners and primary burner will be throttled for close to stoichiometric operation which will be necessary to maintain the required heat input to the drying and preliminary combustion chamber and also to maintain a low oxygen presence within the chamber to prevent oxidation of the material. On the other hand, if the material being dried is high in hydrocarbon, then the air to fuel ratio for the secondary and primary burners will be throttled for a high oxygen rich flame. However, the excess oxygen is quickly consumed by the additional hydrocarbon which acts as fuel for the process with the overall result that the atmosphere within the drying and preliminary combustion chamber is, nevertheless, a reducing atmosphere. The amount of excess oxygen by calculation as to the amount of oxygen which could be consumed by complete combustion of the hydrocarbons present is not sufficient for complete combustion and the result is that not all of the material within the drum will ignite but will smolder producing a reducing atmosphere or effluent which is rich in hydrocarbons.

The products of combustion from the primary burner 66 which are directed through the drum will cause a flow of gases downwardly through the drum which will exit at the discharge end thereof. The hydrocarbon rich effluent will pass from the lower end of the drum and will migrate by convection back toward the effluent entry ports 71 in the chamber divider wall 34. In this manner, the effluent will pass into the mixing section 68 of the combustion completion chamber 31.

The secondary burners 23 are cut back in their heat input where there is a high presence of hydrocarbon in the drying and preliminary combustion chamber because the process is designed to use the hydrocarbon in the material as they fuel for the heating process. This is also necessary to prevent the temperatures in the drying and preliminary combustion chamber from exceeding the maximum temperatures desired inasmuch as the hydrocarbon itself in the presence of the oxygen being injected through the secondary burners sustains sufficient combustion within the drying and preliminary combustion chamber required to maintain the heat level.

The hydrocarbon rich effluent, upon entering the combustion completion chamber, will be elevated in temperature therein due to the high temperature of gases present in the combustion completion chamber. The high velocity air injectors 22 will be operating at this time at a low set point injecting a low level of air to the combustion completion chamber. The effluent, upon reaching the elevated temperature and coming into contact with the oxygen present in the combustion completion chamber, will ignite and burn within the chamber. As this occurs, the temperature within the chamber will begin to increase. This is sensed by the temperature sensing probe 76 which will operate through servo controls (not shown) to further increase the quantity of air injected by the air injectors 22. Further increasing temperatures within the combustion completion chamber will be indicative of the presence of further quantities of combustible hydrocarbons which will likewise control further air injection until the temperatures stabilize within the chamber at which point the air injectors will be held at a given point to maintain the stability.

In an operating condition, temperatures in the range of 2500 degrees are achieved in the combustion completion chamber in cases wherein the material being dried is heavy with hydrocarbons. In the event that this temperature would be exceeded, appropriate servo controls are employed (not shown) to slow down the operation of the screw conveyor to limit the feed rate of hydrocarbons to the system.

The combustion completion chamber chimney operating in conjunction with the negative pressure control damper 18 and the effluent restriction discharge port 72 will stabilize the negative pressure within the combustion completion chamber 31. This negative pressure will be set so as to induce a flow of gases through the combustion completion chamber into the expansion and settling chamber at a velocity at which particulate matter within the gases may settle within the expansion and settling chamber and also maintain a low velocity which will further insure complete burning of the gases within the combustion completion chamber.

The temperature and pollution components of the gases being emitted from the combustion completion chamber chimney will be monitored. If necessary, the preheat and pilot burners may be operated at a higher input to generate further heat and consume combustibles within the combustion completion chamber as necessary.

As previously described, the dried material being discharged from the drying drum assembly will be passed into the discharge hopper 25. The discharge hopper, vibratory metering conveyor 26 and its associated discharge chute assembly 27 are all atmospherically sealed and thermally insulated to prevent oxidation of the material passing to the press feed hopper as well as cooling thereof. The material will be moved from the discharge hopper, as required, by the vibratory metering conveyor to maintain the press feed hopper full. The material will then pass hot from the press feed hopper to the press wherein it will become compacted into briquettes. The absence of any moisture or other volatiles in the briquette plus the elevated temperature of the material will provide a briquette of far greater integrety and intensity than that heretofore known.

The reducing atmosphere present in the drying and preliminary combustion chamber will, in the presence of the hot material, actually increase the carbon content in the material. Additionally, the reducing atmosphere will prevent the loss of silicon in the material as well.

Various alloying materials such as chrome, nickel and the like, as required, may be intermixed with the metallic particles to be dried in the feed hopper or at any other point along the system and placed in the drying drum assembly. This alloy material will then become mixed with the material to be dried and will be discharged into the discharge hopper thoroughly intermixed with the material. The presence of the alloy material in the resultant briquette will produce a briquette which, when remelted, will produce a melt which may contain any combination of alloy material desired.

III. Typical Installation

Hereinafter will be a description of the size, temperatures, pressures and other variables which will be encountered in a typical installation capable of producing approximately five tons per hour of dried and de-oiled material. These variables will, of course, differ substantially depending on the size of system employed and the particular installation involved.

A typical five ton per hour system would utilize a dryer assembly 10 of length of approximately 16 feet, width 8 feet and a drying and preliminary combustion chamber height of approximately 5 feet 8 inches while the combustion completion chamber would be of a height of approximately 5 feet 7 inches.

A briquetting press which may be utilized with the system is one manufactured by C-E Cast Industrial Products, Division of Combustion Engineering, Inc. and known as Model BL-500. This press produces approximately five tons of briquettes per hour which are approximately 5 inches in diameter and weigh approximately 15 pounds per briquette. The press develops approximately 500 tons piston load to compress the briquettes. Any other suitable press or compacting device may be used to produce a compressed or compacted briquette, slug or the like of high density metallic particles. The particular form and size of briquette or slug is not significant.

The drying drum assembly is 46 inches in diameter and 11 and 4 inches in length. The screw conveyor 16 employs a 9 inch diameter screw with an initial 3 inch pitch progressing to a 12 inch pitch over an eight foot length.

The effluent entry ports 71 are approximately 2.75 inches by 4.50 inches having a total cross-sectional area combined of 2.15 square feet and are 25 in number. The effluent restriction discharge port 72 is approximately 2 feet 3 inches by 4 feet 6 inches in size.

The negative pressure range within the elongate combustion completion chamber may be varied according to the damper setting between atmospheric and 0.275 inches of water. The preferred negative pressure during operation is approximately 0.04 inches of water.

The discharge hopper 25 is designed to hold approximately one ton of material in the discharge hopper in the five ton per hour unit. This is approximately 12 minutes storage or retention for the press during normal operating conditions.

The force cooling for the drum shaft is approximately 12 gallons per minute of water passage through the drum. This flow rate may be varied depending on operating temperatures.

Set out hereinafter will be the various flow rates and temperatures expected in the system in a typical operating condition utilizing cast iron borings as the material being dried wherein the borings contain approximately 0.3 percent carbon. The assumed conditions will be cast iron borings with a 3 percent hydrocarbon by weight content of industrial cutting oil.

In the specific example, the screw conveyor will be operated at approximately 18 RPM to maintain a five ton per hour throughput. The drum speed will be operated at approximately 3.2 RPM and the material therein will have a three to five minute retention time.

The primary burner has a capability of operating between 250 CFH and 1250 CFH of natural gas and a range of between 250 CFH to 12,500 CFH of air. The secondary burners have a gas throughput range of between 100 CFH and 500 CFH of natural gas and air between 1000 CFH and 5000 CFH. In the particular example concerned, the primary burner was operated at 5000 CFH of air and 250 CFH of gas to produce approximately 500,000 BTU's/hr. while each of the four secondary burners was operated at approximately 300 CFH of gas and 3000 CFH of air to produce approximately 300,000 BTU's/hr. output each.

In the specific example, the temperature within the drying and preliminary combustion chamber was approximately 1,250 degrees Fahrenheit. The temperature of the chips upon reaching the press were approximately 950 degrees Fahrenheit.

The preheating and pilot burners 21 in the embodiment being described are capable of operating between 100 CFH and 450 CFH of gas and air throughput of 1000 CFH to 4500 CFH. The high velocity air injectors 22 are capable of being operated within a range from a minimum of 2500 CFH to 25,000 CFH. In the example involved, the preheat and pilot burners were operated at a throughput of 200 CFH of gas and 2000 CFH of air to produce a 200,000 BTU/hr. output whereas the air injectors were operated at 6,250 CFH output. The resultant temperature in the combustion completion chamber was approximately 1700 degrees Fahrenheit.

In the specific example involved, the gas flow velocity in the drying and preliminary combustion chamber is approximately one foot per second. The estimated gas velocity in the combustion and completion chamber is approximately 1.9 feet per second in the expansion and settling chamber 70.

The system of the present invention, including the methods and apparatus involved therein, has been described in respect to a particular embodiment thereof as set forth in the specification and the drawings. However, it is to be understood that no limitation as to the scope of the invention was thereby intended, the scope of the invention being determine by the following claims.

What is claimed is:

1. In apparatus for drying and preheating small metallic particles to remove volatiles therefrom of the type having an internally heated drying chamber and conveyor means within the drying chamber for conveying the particles through the drying chamber, the improvements in the conveyor means comprising: a drying drum opened at both ends positioned within the drying chamber and adapted to receive and convey internally through the drying drum the particles to be dried; drum support means supporting the drying drum for axial rotation within the drying chamber; the lower inner portion of the drying chamber being of a configuration complementary to the exterior configuration of the drying drum and wherein the drying drum is supported in close proximity to the lower portion of the drying chamber and wherein the exterior surface of the drum further includes a continuous arcuate flight substantially along the length of the drying drum and of a positive lead angle to the direction of rotation of the drying drum to continuously remove fine particulate matter settling to the lower portion of the drying chamber.

2. The apparatus of claim 1 wherein the drying drum is inclined slightly vertically and includes a plurality of rows of overlapping arcuate segments disposed within the inner circumference of the drum each segment inclined longitudinally of the drum at a reverse lead angle to the direction of drum rotation and each end of which is disposed longitudinally of the drum from one another to increase mixing of the metallic particles and retention thereof within the drum.

3. The apparatus of claim 2 further including a plurality of rows of paddles selectively disposed between rows of arcuate segments and secured to the inner circumference of the drum each paddle being inclined longitudinally of the drum at a reverse lead angle to the direction of rotation to increase retention of the particles within the drum.

4. The apparatus of claim 3 further including a row of paddles secured to the inner circumference of the drum and positioned at the upper entrance end of the drying drum and inclined longitudinally of the drum at a forward lead angle to the direction of drum rotation to insure entrance and retention of the particles to be dryed at the entrance end of the 5. The apparatus of claim 1 further including a discharge chute extending from the drying chamber and positioned beneath the lower end of the drying drum; and baffle means within the discharge chute to divert and separate the fine particulate matter discharging from along the exterior circumference of the drum from the dried small metallic particles discharging from the interior of the drying drum.

6. In apparatus for drying and preheating small metallic particles to remove volatiles therefrom of the type having an internally heated drying chamber and conveyor means within the drying chamber for conveying the particles through the drying chamber, the improvements in the conveyor means comprising: a drying drum opened at both ends positioned within the drying chamber and adapted to receive and convey internally through the drying drum the particles to be dried; a drum support shaft extending longitudinally through the drying chamber and journaled for rotation therein; water cooling means including a thin outer shell positioned around the drum shaft and further including means for passing water between the outer shell and the outer surface of the drum shaft to provide uniform cooling of the entire drum shaft thickness.

7. The apparatus of claim 6 further including a plurality of hubs positioned along the drum shaft, each hub having extending therefrom a plurality of spokes interconnecting the hubs to the inner circumference of the drying drum.

8. The apparatus of claim 7 wherein the spokes are interconnected to the hubs at an angle tangent to the hub to provide for relief of radial compression resulting from metallic expansion during heating of the drum.

9. The apparatus of claim 7 wherein the hubs are free-floating longitudinally on the drum shaft and further including one interlocking means between a selected hub on the drum shaft and the drum shaft whereby longitudinal expansion and contraction of the drum will be independent of contraction and expansion of the drum shaft.

* * * * *

UNITED STATES PATENT AND TRADEMARK OFFICE
CERTIFICATE OF CORRECTION

PATENT NO. : 4,260,373
DATED : April 7, 1981
INVENTOR(S) : John R. Fellnor, William J. Love, Jr.

It is certified that error appears in the above—identified patent and that said Letters Patent is hereby corrected as shown below:

Column 12, line 36, after "drying" insert --chamber--

Column 18, line 7 of Claim 4, after "the" (second occurrence) insert --drum.--

Signed and Sealed this

Twentieth Day of October 1981

[SEAL]

Attest:

GERALD J. MOSSINGHOFF

Attesting Officer        Commissioner of Patents and Trademarks